(12) United States Patent
Ma et al.

(10) Patent No.: US 11,215,809 B2
(45) Date of Patent: Jan. 4, 2022

(54) PERISCOPE-TYPE ZOOMING CAMERA MODULE

(71) Applicant: TRIPLE WIN TECHNOLOGY (SHENZHEN) CO. LTD., Shenzhen (CN)

(72) Inventors: Xiao-Mei Ma, Guangdong (CN); Shin-Wen Chen, New Taipei (TW); Long-Fei Zhang, Guangdong (CN); Kun Li, Guangdong (CN)

(73) Assignee: TRIPLE WIN TECHNOLOGY (SHENZHEN) CO. LTD., Shenzhen (CN)

( * ) Notice: Subject to any disclaimer, the term of this patent is extended or adjusted under 35 U.S.C. 154(b) by 172 days.

(21) Appl. No.: 16/710,092

(22) Filed: Dec. 11, 2019

(65) Prior Publication Data
US 2021/0141206 A1    May 13, 2021

(30) Foreign Application Priority Data
Nov. 13, 2019   (CN) .......................... 201921958948.2

(51) Int. Cl.
*G02B 23/08*   (2006.01)
*H04N 5/225*   (2006.01)
*G02B 7/105*   (2021.01)
*G02B 15/14*   (2006.01)

(52) U.S. Cl.
CPC ............. *G02B 23/08* (2013.01); *G02B 7/105* (2013.01); *G02B 15/142* (2019.08); *H04N 5/2257* (2013.01)

(58) Field of Classification Search
CPC ...... G02B 23/08; G02B 7/105; G02B 15/142; G02B 13/0065; G02B 13/007; H04N 5/2257; H04N 5/2253; H04N 5/2245
See application file for complete search history.

(56) References Cited

U.S. PATENT DOCUMENTS

2021/0116682 A1*   4/2021   Smolka .............. G02B 13/0065
* cited by examiner

*Primary Examiner* — Robert E. Tallman
(74) *Attorney, Agent, or Firm* — ScienBiziP, P.C.

(57) ABSTRACT

A periscope-type zooming camera module which requires no voice-coil unit includes a light steering device, a lens unit, a light sensing assembly, and a zooming assembly. The light steering device changes transmission direction of light. The lens unit is arranged to receive light from the light steering device; and the light sensing assembly is arranged to receive light from the lens unit. The zooming assembly merely requires different levels of voltage to zoom in and out, adjusting focal length of the lens unit.

17 Claims, 8 Drawing Sheets

PERISCOPE-TYPE ZOOMING CAMERA MODULE

The subject matter herein generally relates to optical devices, a multifunction sensing device, in particular relates to a periscope-type zooming camera module.

BACKGROUND

Periscope-type zooming camera in electronic devices, such as digital cameras and mobile phones, can use a voice coil motor or a combination of a spherical lens and an aspherical lenses for zooming. These periscope-type zooming cameras are complex, large in size, and consume much power.

BRIEF DESCRIPTION OF THE DRAWINGS

Implementations of the present technology will now be described, by way of embodiments, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like. The references "a plurality of" and "a number of" mean "at least two."

FIG. 1-4 illustrate a periscope-type zooming camera module 100 according to a first embodiment. The periscope zooming camera module 100 is a camera device, used by smartphones, tablets, laptops, and portable devices.

The periscope-type zooming camera module 100 includes a bearing frame 1, a light sensing assembly 2, a filter assembly 3, a lens unit 4, a light steering device 5, and a zooming assembly 6. The bearing frame 1 is used for holding the light steering device 5, the lens unit 4, the zooming assembly 6, the light filter assembly 3, and the light sensing assembly 2.

The zooming assembly 6, the light steering device 5, the lens unit 4, and the filter assembly 3 are arranged in a path of the light sensing assembly 2. In the embodiment, the lens unit 4 is located between the filter assembly 3 and the light steering device 5. Light falls firstly on the zooming assembly 6, and then on or in the light steering device 5. The light steering device 5 changes of 90 degrees of a transmission direction of the incident light, and the incident light lastly forms an image on the light sensing assembly 2 after passing through the lens unit 4. That is, the light steering device 5 enables incident light to pass through the lens unit 4 after steering and finally to reach the light sensing assembly 2.

In the embodiment, the bearing frame 1 is a square hollow frame body and formed by two first side plates 10 and two second side plates 12, and each first side plate 10 is perpendicularly connected to each second side plate 12. The light sensing assembly 2 includes a printed circuit board 20 and an imaging sensor 22 electrically connected to the printed circuit board 20. The printed circuit board 20 can be a flexible board, or a hard board, or a rigid-flexible board. In this embodiment, the printed circuit board 20 is a flexible-rigid combined board and includes a first circuit board body 201, a second circuit board 203, a third circuit board body 205, a fourth circuit board body 207, and three flexible boards 209.

The first circuit board 201 is fixed on one side plate 10. The second circuit board 203 is connected to the first circuit board body 201 via one flexible board 209 and faces the first circuit board body 201. The third circuit board body 205 is perpendicularly connected to the first circuit board body 201 via one flexible board 209 and fixed to one second side plate 12. The fourth circuit board body 207 is connected with a bottom edge of the first circuit board body 201 through one flexible board 209. The second circuit board 203 faces the first circuit board 201 for mounting the imaging sensor 22. The third circuit board 205 is perpendicular to the first circuit board 201 to electrically connect with the drive portion 53 included in the light steering device 5, and controls the driving portion 53. The fourth circuit board body 207 is located outside the bearing frame 1 for setting an electrical connector 211.

The imaging sensor 22 is a complementary metal oxide semiconductor (CMOS) or a charge coupled device (CCD). The light sensing assembly 2 receives light entering the periscope-type zooming camera module 100 and passing through the lens unit 4, and converts the optical signal into an electrical signal and outputs the same through the printed circuit board 20.

The filter assembly 3 includes a supporting frame 30 and a filter 32 fixed to the supporting frame 30. Two opposite sides of supporting frame 30 are fixed to the second side plates 12. In this embodiment, two opposite sides of the supporting frame 30 are fixed with the bearing frame 1, and the filter 32 is fixed to the supporting frame 30 through an adhesive on the periphery of the filter 32. The filter 32 is can be an infrared cut-off filter, a wafer infrared cut-off filter, a blue glass filter, and so on.

The light steering device 5 includes a light steering member 51 and a driving portion 53. The driving portion 53 bears on one first side plate 10 and faces the imaging sensor 22. The driving portion defines a receiving portion 530 at center. The light steering member 51 is installed in the receiving portion 530. The driving portion 53 is electrically connected to the printed circuit board 20, and receives power and control signals therefrom. The light steering member 51 changes the transmission direction of light. The driving portion 53 can rotate the light steering member 51 in an axial rotation mode to realize optical anti-shake in different directions, such as axial rotation along an optical axis of the periscope-type zooming camera module 100 or along an axial rotation of an incident light of the optical light steering member 51, to achieve optical anti-shaking.

The light steering member 51 is a prism, a reflecting plate, or a plane mirror. In the present embodiment, the light steering member 51 is a triangular prism, and section of the prism is a right triangle. Light from one of the right edges of the right triangle is reflected by the oblique edge so as to be emitted at the other right angle edge. That is, the light steering member 51 causes the light to change 90 degrees in direction, for example, a light incident from a vertical direction, after passing through the light steering member 51, is emitted along a horizontal direction.

The light steering member 51 can be made of glass, plastic, or material with good light transmittance. In one embodiment, reflective material such as silver may coat one of the surfaces of the prism to reflect incident light.

The lens unit 4 is a fixed-focus lens unit. The lens unit 4 includes a lens pedestal 40, a lens barrel 42 matched with the lens pedestal 40, and an optical lens 44 arranged in the lens barrel 42. The lens pedestal 40 is arranged between the light steering device 5 and the filter assembly 3 and fixed to the supporting frame 30 via an adhesive 34. Two opposite sides of the lens pedestal 40 are fixed to two of the first side plates 10. In this embodiment, the lens barrel 42 includes only one optical lens 44. In other embodiments, at least two optical lenses may be provided in the lens barrel 42. The optical lenses may be a combination of a spherical lens and an aspherical lens for effectively improving image quality, or the optical lens 44 may be a molded glass lens.

Although using a fixed-focus lens as an example in FIGS. 1-4 to describe characteristics and advantages of the periscope-type zooming camera module 100, the fixed-focus lens disclosed in FIGS. 1-4 and herein described is only an example, it does not constitute a limitation on the content and scope of the utility model. In other examples of the periscope-type zooming camera module 100, the lens unit 4 may also be implemented as a wide-angle lens, a long-focus lens, and a standard lens. That is, type of the lens unit 4 is not limited.

Referring to FIG. 4 again, the zooming assembly 6 is arranged on one side of the light steering device 5 and outside of the bearing frame 1. In this embodiment, the zooming assembly 6 is a zooming lens or a liquid crystal lens.

Figure 1:
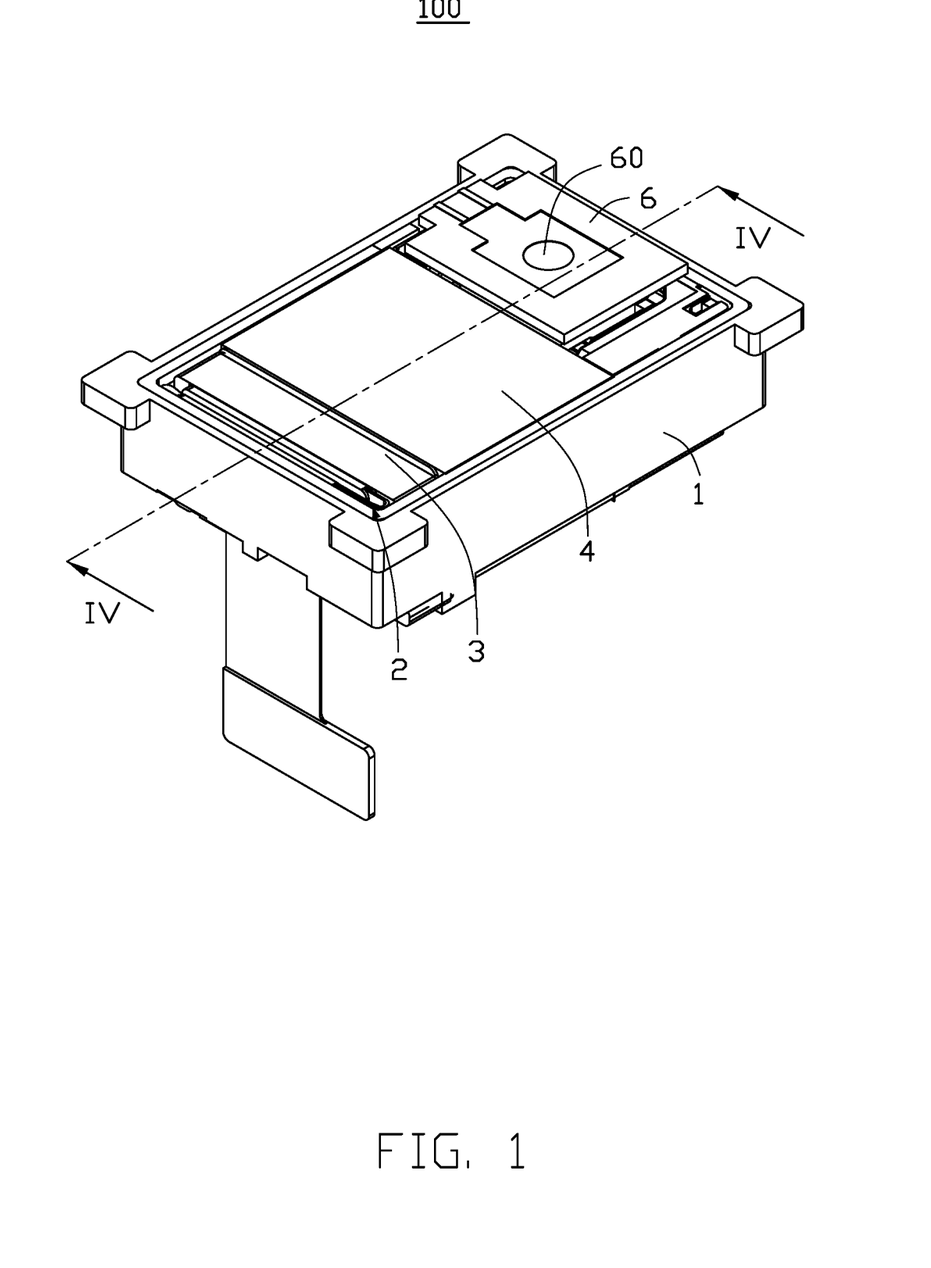
FIG. 1 is an isometric view of a periscope-type zooming camera module in accordance with one exemplary embodiment.
Figure 2:
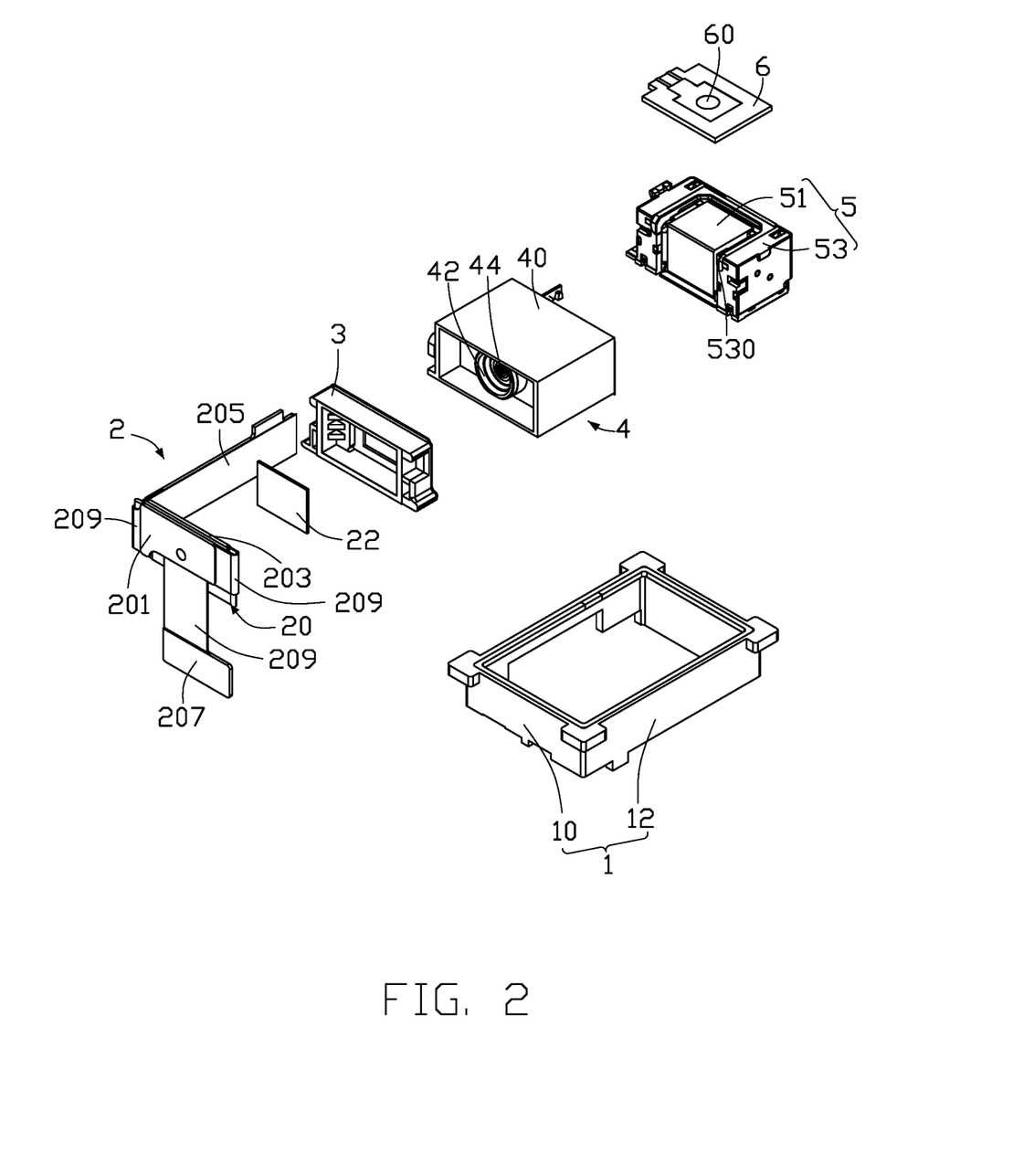
FIG. 2 is one exploded isometric view of the periscope-type zooming camera module in FIG. 1.
Figure 3:
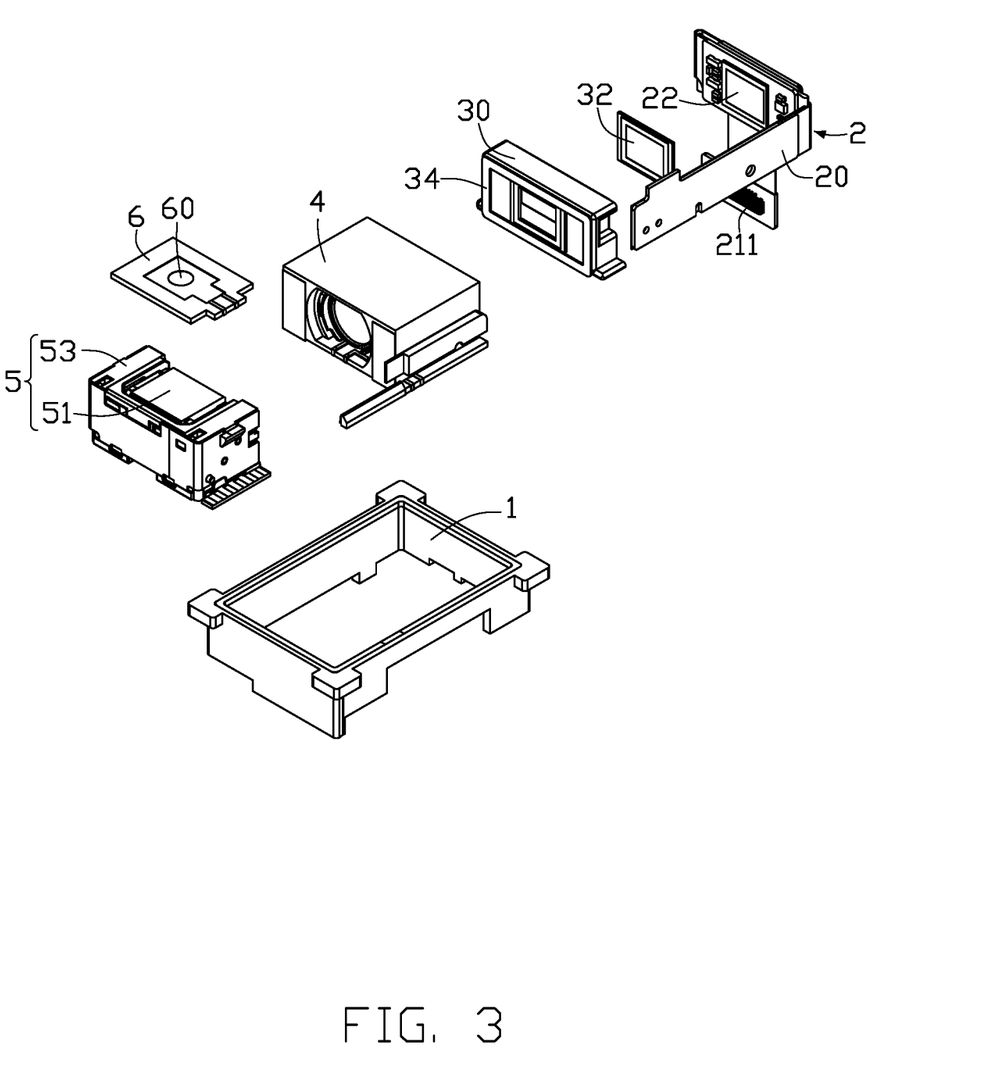
FIG. 3 is another exploded isometric view of the periscope-type zooming camera module in FIG. 1.
Figure 4:
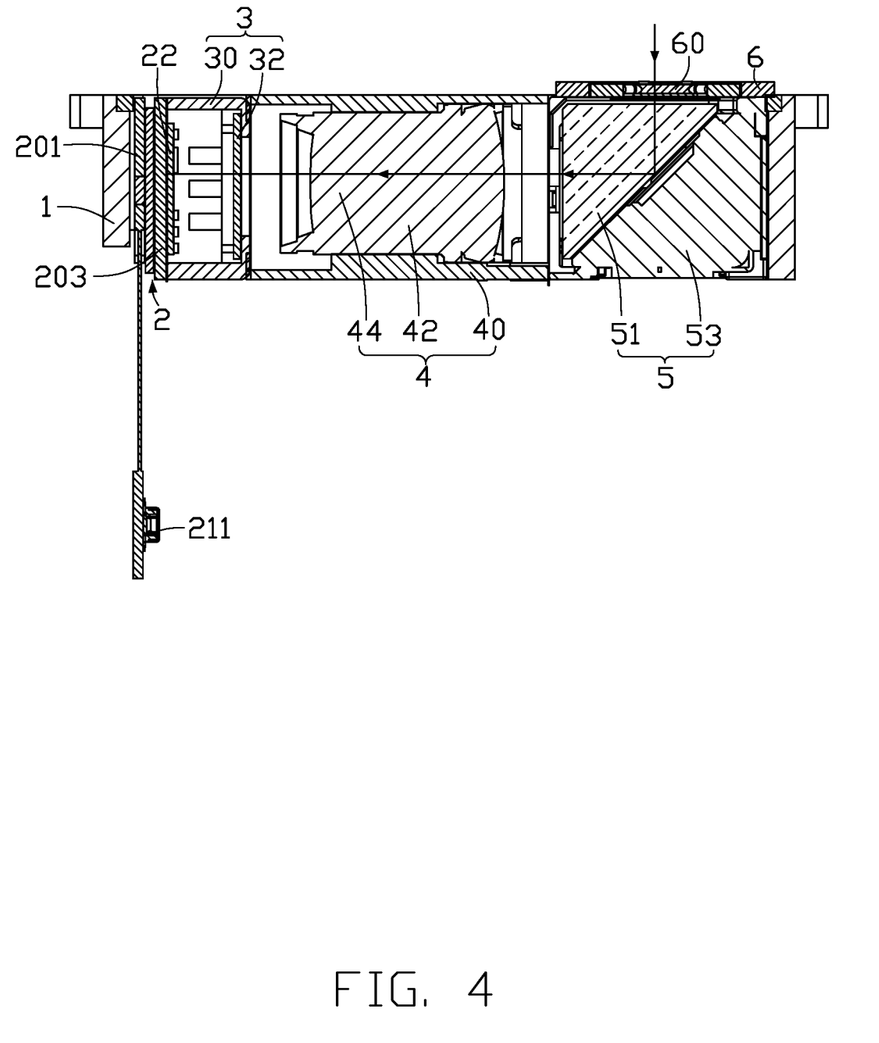
FIG. 4 is a cross-sectional view along line IV-IV of the periscope-type zooming camera module in FIG. 1.
Figure 5:
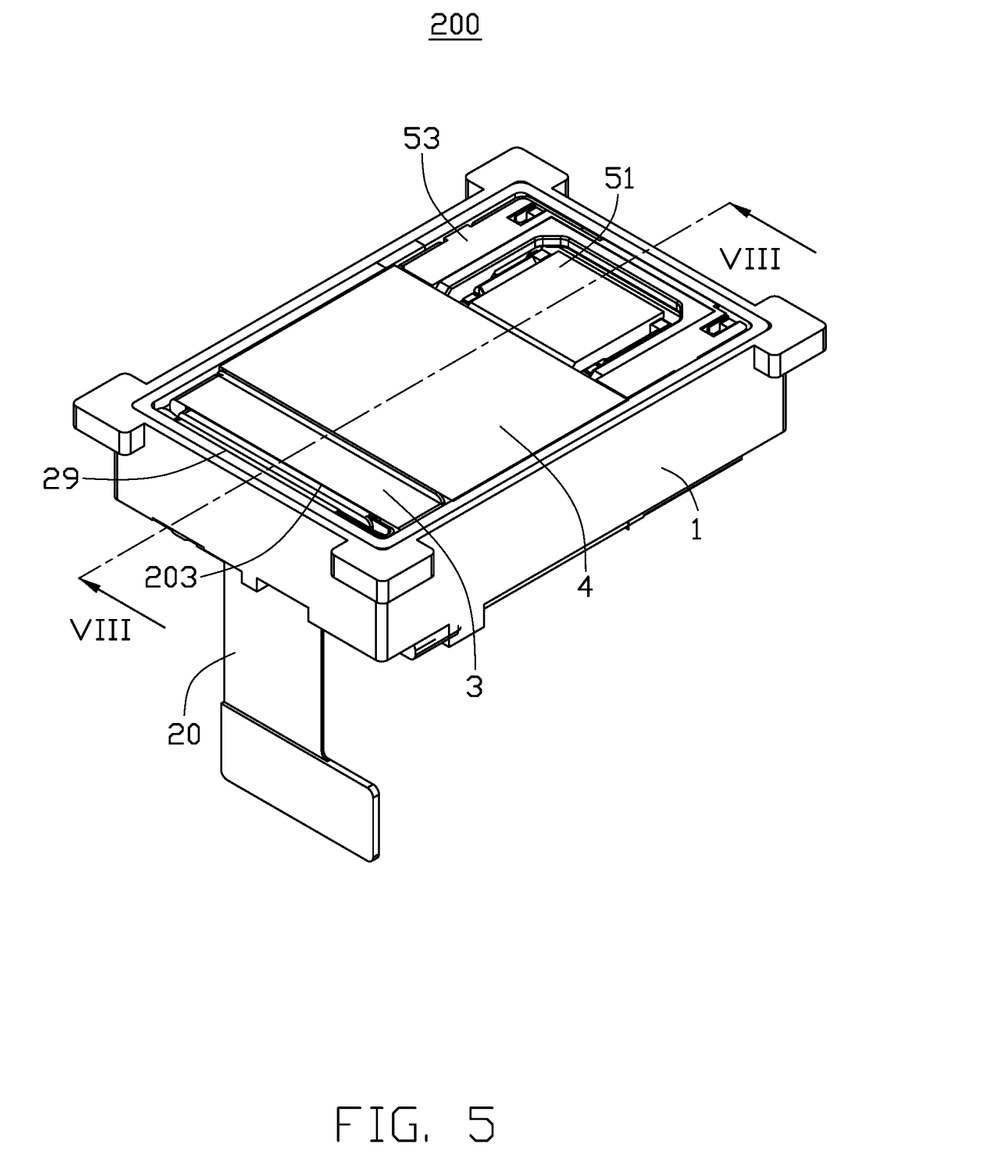
FIG. 5 is an isometric view of a periscope-type zooming camera module in accordance with one exemplary embodiment.
Figure 6:
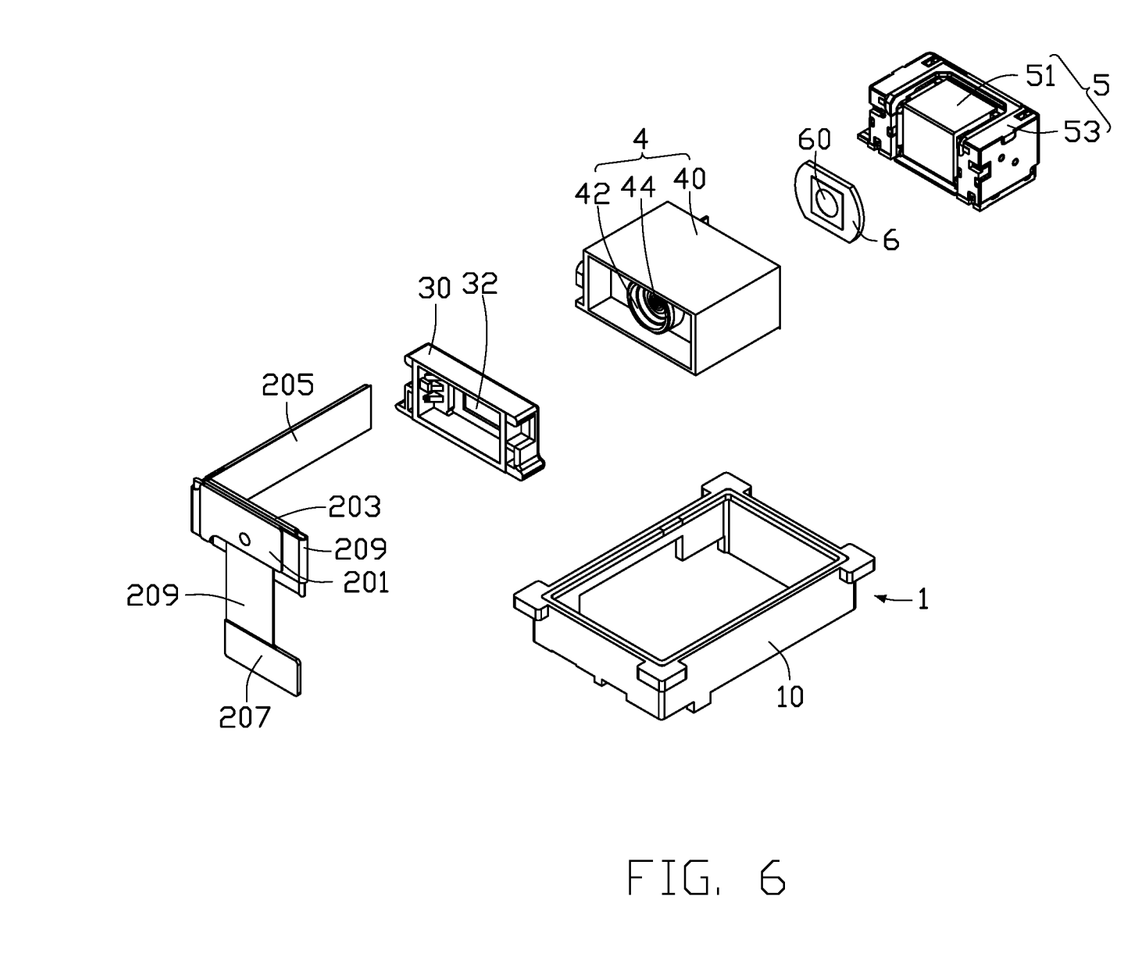
FIG. 6 is one exploded isometric view of the periscope-type zooming camera module in FIG. 5.
Figure 7:
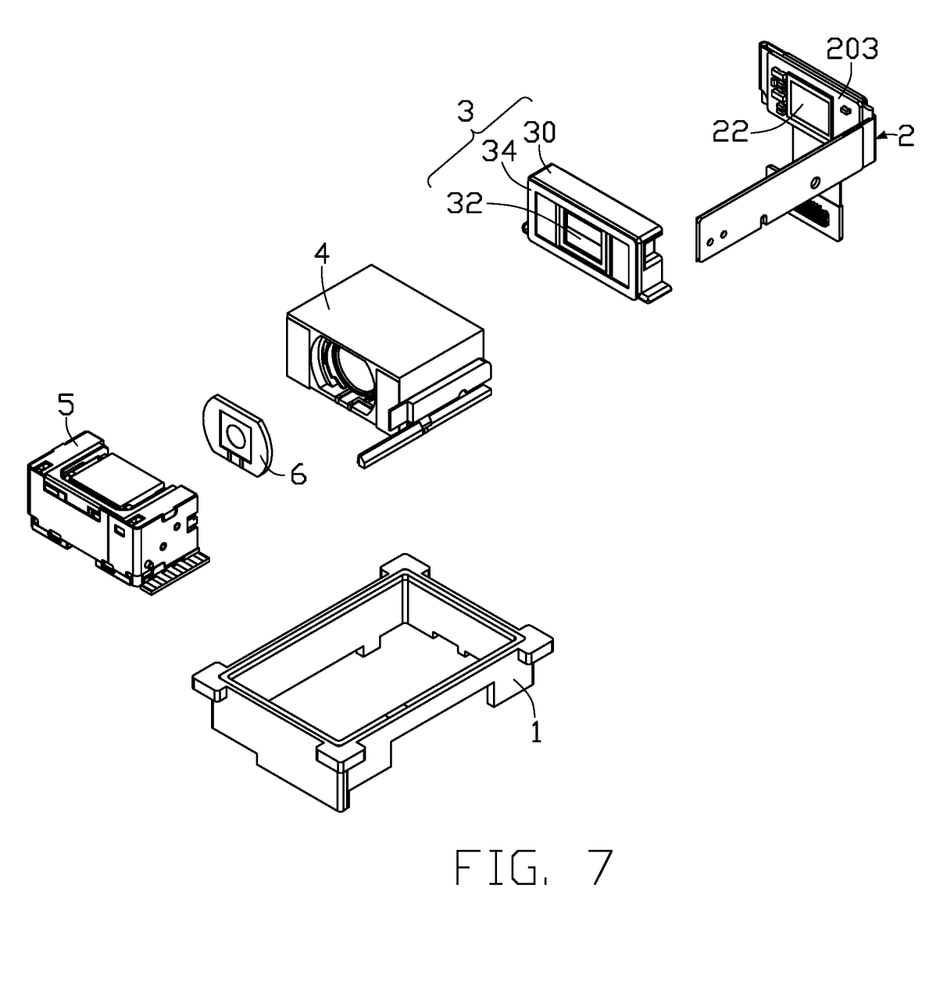
FIG. 7 is another exploded isometric view of the periscope-type zooming camera module in FIG. 5.
Figure 8:
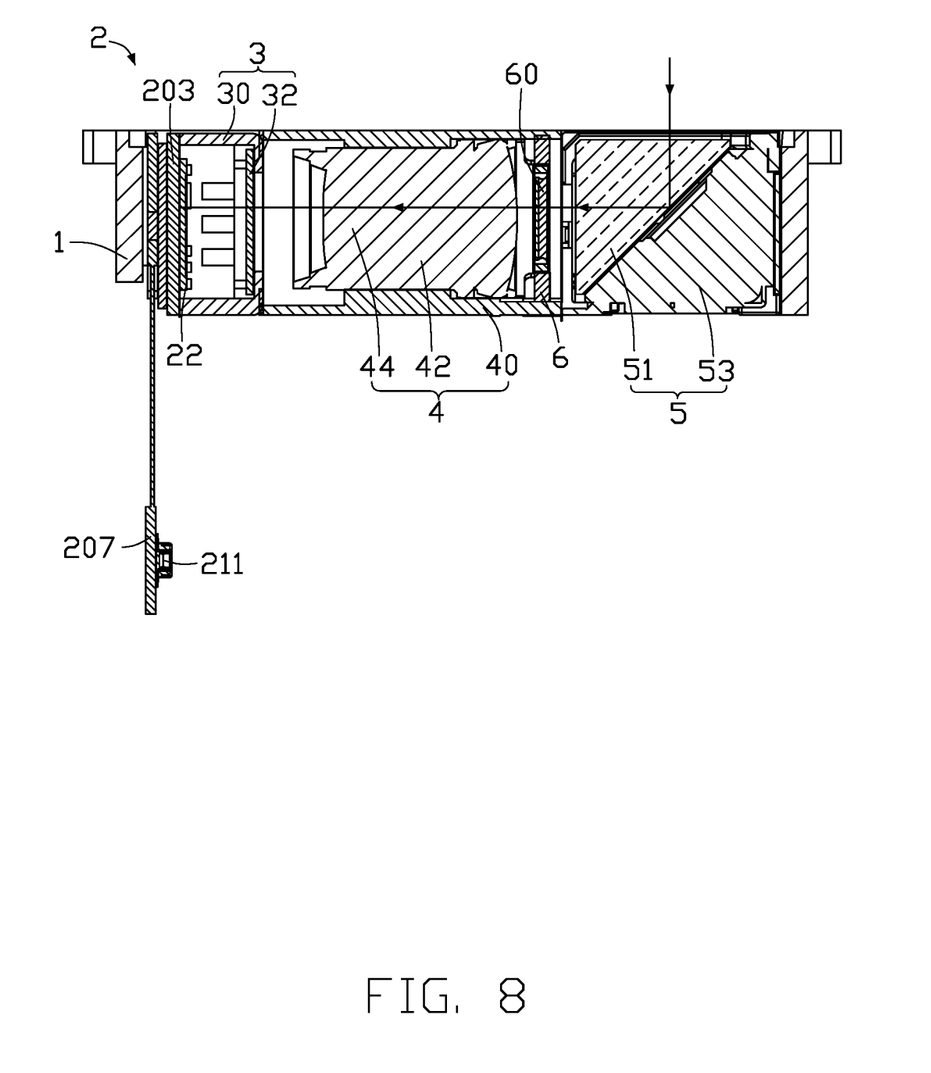
FIG. 8 is a cross-sectional view along line VIII-VIII of the periscope-type zooming camera module in FIG. 5.

For example, the zooming assembly 6 is a zooming lens and includes an optical lens 60 formed by transparent piezoelectric materials with piezoelectric properties and two electrode layers (not shown). The optical lens 60 has a front surface and a rear surface opposite to the front surface, an electrode layer is formed on the front surface and an electrode layer is formed on the rear surface. When voltage is applied on the two electrode layers, the optical lens 60 is stretched or compressed, and radius of curvature of the optical lens 60 is changed and the focal length of the lens unit 4 changes according to the change of radius of curvature of the zooming lens.

Structure of the zooming lens is not limited, and any zooming lens formed by transparent piezoelectric materials with piezoelectric properties can be used.

A basic structure of a liquid crystal zooming lens generally includes two electrode substrates arranged in parallel and opposite to each other, surfaces of the two electrode substrates toward each other each have one orientation layer, and a liquid crystal is arranged between the two orientation layers. Thus, by controlling the voltage applied on the two electrode substrates of the liquid crystal zooming lens, the liquid crystal molecule arrangement of the liquid crystal layer changes. The refractive index changes according to the voltage to change the focal length of the liquid crystal zooming lens.

A working principle of the periscope-type zooming camera module 100 is that external light enters the zooming assembly 6, passes through the zooming assembly 6, and then incidents on the light steering device 5. The light steering device 5 changes transmission direction of the light, and the external light enters the lens unit 4 and the filter assembly 3 in turn, the filter assembly 3 filters out stray light, and the light lastly reaches the light sensing assembly 2.

In other examples of the periscope-type zooming camera module 100, quantities of the light steering device 5 and of the lens unit 4 may be more than one to improve effectiveness of the periscope-type zooming camera module 100. Focal length of the zooming assembly 6 is able to be adjusted by applying different voltages. This replaces the voice coil motor in the prior art for zooming function, so that the structure of the periscope-type zooming camera module 100 is simpler, and a power consumption of the periscope-type zooming camera module 100 is reduced.

FIGS. 5-8 show a periscope-type zooming camera module 200 according to another embodiment. The periscope-type zooming camera module 200 in FIGS. 5-8 is similar to periscope-type zooming camera module 100 in FIGS. 1-4. That is, the periscope-type zooming camera module 200 also includes a bearing frame 1, a light sensing assembly 2 arranged in the bearing frame 1, a filter assembly 3, a lens unit 4, a light steering device 5, and a zooming assembly 6.

The difference between the periscope-type zooming camera module 200 and the periscope-type zooming camera module 100 in FIGS. 1-4 is that the zooming assembly 6 in the periscope-type zooming camera module 200 is arranged inside the bearing frame 1 and located between the light steering device 5 and the lens unit 4. The working principle of the periscope-type zooming camera module 200 is that external light first enters the light steering device 5, the light steering device 5 changes transmission direction of the incident light, and the external light then enters the zooming assembly 6. The zooming assembly 6 adjusts focal length of the light incident thereon and the light is then incident to the lens unit 4, finally reaching the light sensing assembly 2.

The embodiments shown and described above are only examples. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A periscope-type zooming camera module, comprising:
   a light steering device configured for changing transmission direction of light;
   a lens unit arranged on a light path of the light steering device; and
   a light sensing assembly arranged on a light path of the lens unit; the periscope-type zooming camera module further comprising a zooming assembly arranged on a light path of the light sensing assembly, the zooming assembly being configured for adjusting a focus length of the lens unit;
   wherein the lens unit is a fixed-focal lens unit, the lens unit comprises a lens pedestal, a lens barrel matched with the lens pedestal, and an optical lens arranged in the lens barrel.

2. The periscope-type zooming camera module of claim 1, wherein the light sensing assembly is arranged between the light steering device and the lens unit, and the periscope-type zooming camera defines a light path of an incident light comprising an incident light incidents on the light steering device, and changes of 90 degrees of a transmission direction of the incident light, incidents on the zooming assembly, emits out from the zooming assembly, enters the lens unit, and forms an image on the light sensing assembly.

3. The periscope-type zooming camera module of claim 1, wherein the light sensing assembly is arranged at one side of the light steering device away from the lens unit, and the periscope-type zooming camera defines a light path of an incident light comprising: an incident light incidents on the zooming assembly and enters the light steering device, and changes of 90 degrees of a transmission direction of the incident light, enters the lens unit, and forms an image on the light sensing assembly.

4. The periscope-type zooming camera module of claim 3, further comprises a bearing frame configured for holding the light steering device, the lens unit, the zooming assembly and the light sensing assembly.

5. The periscope-type zooming camera module of claim 4, wherein the bearing frame is a square frame body formed by two first side plates and two second side plates, and each first side plate is perpendicularly connected to each second side plate.

6. The periscope-type zooming camera module of claim 5, wherein the light sensing assembly comprises a printed circuit board and an imaging sensor electrically connected to the printed circuit board, and the printed circuit board is a flexible-rigid combined board.

7. The periscope-type zooming camera module of claim 6, wherein the printed circuit board comprises a first circuit board body, a second circuit board, a third circuit board body, a fourth circuit board body and three flexible boards, the first circuit board is fixed on one first side plate, the second circuit board is connected to the first circuit board body via one flexible board and faces toward the first circuit board body, the imaging sensor is mounted on the second circuit board body, the third circuit board body perpendicularly connected to the first circuit board body via one flexible board and fixed to one second side plate, the fourth circuit board body connected to a bottom edge of the first circuit board body through one flexible board and located outside the bearing frame for setting the electrical connector.

8. The periscope-type zooming camera module of claim 7, wherein the light steering device comprises a light steering member and a driving portion, the driving portion defines a receiving portion at central thereon and the light steering member is installed in the receiving portion, and the driving portion is electrically connected to the third circuit board body.

9. The periscope-type zooming camera module of claim 8, wherein the light steering member is a prism, a reflecting plate or a plane mirror.

10. The periscope-type zooming camera module of claim 8, further comprising a filter assembly arranged between the imaging sensor and the lens unit, the filter assembly comprises a supporting frame and a filter fixed to the supporting frame, two opposite sides of supporting frame are fixed to the second side plate.

11. The periscope-type zooming camera module of claim 1, wherein the zooming assembly is a zooming lens or a liquid crystal lens.

12. A periscope-type zooming camera module, comprising:
   a light steering device configured for changing transmission direction of incident light;
   a lens unit arranged on a light path of the light steering device; and
   a light sensing assembly arranged on a light path of the lens unit;
   a bearing frame configured for holding the light steering device, the lens unit, and the light sensing assembly and;
   a zooming assembly, wherein the zooming assembly is located at one side of the light steering device away from the lens unit or located inside the bearing frame and between the lens unit and the light sensing assembly;
   wherein the lens unit is a fixed-focal lens unit, the lens unit comprises a lens pedestal, a lens barrel matched with the lens pedestal, and an optical lens arranged in the lens barrel.

13. The periscope-type zooming camera module of claim 12, further comprising a filter assembly arranged between the imaging sensor and the lens unit.

14. The periscope-type zooming camera module of claim 13, wherein the filter assembly comprises a supporting frame and a filter fixed to the supporting frame, two opposite sides of the supporting frame are fixed to two of the second side plate.

15. The periscope-type zooming camera module of claim 14, wherein the light sensing assembly comprises a printed circuit board and an imaging sensor electrically connected to the printed circuit board, and the printed circuit board is a flexible-rigid combined board.

16. The periscope-type zooming camera module of claim 15, wherein the printed circuit board comprises a first circuit board body, a second circuit board, a third circuit board body, a fourth circuit board body and three flexible boards, the first circuit board is fixed on one first side plate, the second circuit board is connected to the first circuit board body via one flexible board and faces toward the first circuit board body, the imaging sensor is mounted on the second circuit board body, the third circuit board body perpendicularly connected to the first circuit board body via one flexible board and fixed to one second side plate, the fourth circuit board body connected to a bottom edge of the first circuit board body through one flexible board and located outside the bearing frame for setting the electrical connector.

17. The periscope-type zooming camera module of claim 16, wherein the light steering device comprises a light steering member and a driving portion, the driving portion defines a receiving portion at central thereon and the light steering member is installed in the receiving portion, and the driving portion is electrically connected to the third circuit board body.

* * * * *